(12) United States Patent
Cordier et al.

(10) Patent No.: US 9,206,841 B2
(45) Date of Patent: Dec. 8, 2015

(54) ROLLING BEARING COMPRISING A HOUSING HAVING TWO PARTS AND METHOD OF MANUFACTURING SUCH A BEARING

(75) Inventors: Stephane Cordier, Tours (FR); Yves-André Liverato, Saint Paterne Racan (FR); Charles Massoteau, Louans (FR); Pietro Tesini, Gothenburg (SE)

(73) Assignee: AKTIEBOLAGET SKF, Gothenburg (SE)

( * ) Notice: Subject to any disclaimer, the term of this patent is extended or adjusted under 35 U.S.C. 154(b) by 75 days.

(21) Appl. No.: 14/118,467

(22) PCT Filed: May 16, 2011

(86) PCT No.: PCT/EP2011/057877
§ 371 (c)(1),
(2), (4) Date: Apr. 3, 2014

(87) PCT Pub. No.: WO2012/155958
PCT Pub. Date: Nov. 22, 2012

(65) Prior Publication Data
US 2014/0341491 A1    Nov. 20, 2014

(51) Int. Cl.
*F16C 43/04* (2006.01)
*F16C 19/16* (2006.01)
(Continued)

(52) U.S. Cl.
CPC ............... *F16C 19/16* (2013.01); *F16C 19/163* (2013.01); *F16C 19/52* (2013.01); *F16C 19/525* (2013.01); *F16C 33/588* (2013.01); *F16C 33/60* (2013.01); *F16C 33/6614* (2013.01); *F16C 33/6651* (2013.01); *F16C 33/6659* (2013.01); *F16C 35/077* (2013.01); *F16C 43/04* (2013.01); *F16C 43/06* (2013.01); *F16C 33/767* (2013.01); *F16C 2361/61* (2013.01); *Y10T 29/4968* (2015.01)

(58) Field of Classification Search
CPC .. F16C 33/60; F16C 33/6611; F16C 33/6614; F16C 33/6648; F16C 33/6651; F16C 35/042; F16C 35/067
USPC ......... 384/467, 473–476, 505, 513, 537, 570, 384/585; 29/898.061, 898.062
See application file for complete search history.

(56) References Cited

U.S. PATENT DOCUMENTS

| 1,359,506 A | 11/1920 | Hoerle |
| 1,420,497 A | 6/1922 | Page |

(Continued)

FOREIGN PATENT DOCUMENTS

| FR | 2923277 A1 | 5/2009 |
| FR | 2945090 A1 | 11/2010 |
| WO | 20060092256 A1 | 9/2006 |

*Primary Examiner* — Phillip A Johnson
(74) *Attorney, Agent, or Firm* — Bryan Peckjian; SKF USA Inc. Patent Dept.

(57) ABSTRACT

A rolling bearing comprising an inner ring, an outer ring, at least one row of rolling elements between the inner and outer rings, and an annular housing surrounding at least one of the rings, said outer ring comprising two separate parts, the housing comprising two distinct parts for retaining the parts of said outer ring and fixing means for fixing the distinct parts together. The first part of the housing comprises an inner axial cylindrical portion for retaining radially said outer ring and the second part of the housing comprises an outer axial cylindrical portion surrounding said inner axial cylindrical portion.

9 Claims, 3 Drawing Sheets

(51) Int. Cl.
  *F16C 19/52* (2006.01)
  *F16C 33/58* (2006.01)
  *F16C 33/60* (2006.01)
  *F16C 33/66* (2006.01)
  *F16C 35/077* (2006.01)
  *F16C 43/06* (2006.01)
  *F16C 33/76* (2006.01)

(56) References Cited

U.S. PATENT DOCUMENTS 3,741,361 A * 6/1973 Brandenstein ............ 192/110 B
3,749,460 A   7/1973 Hogan
3,876,266 A   4/1975 Rozentals
8,740,466 B2 * 6/2014 Schwarzbich et al. ........ 384/537

* cited by examiner

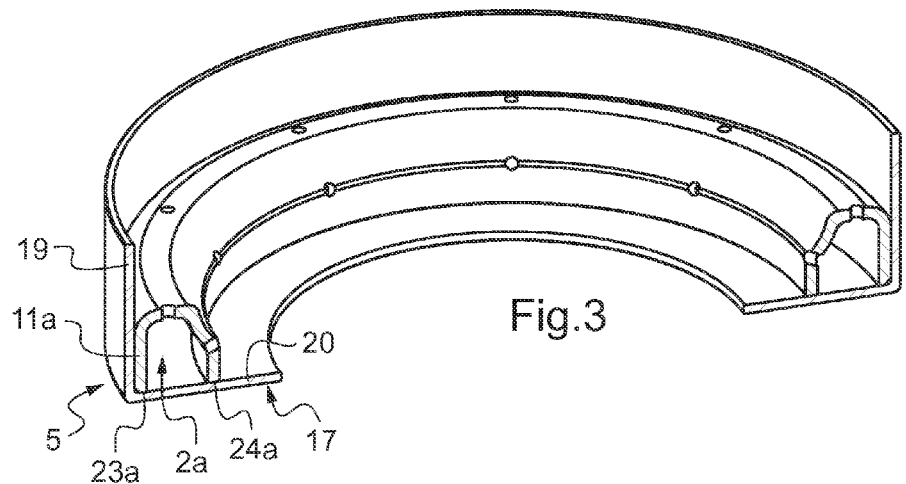
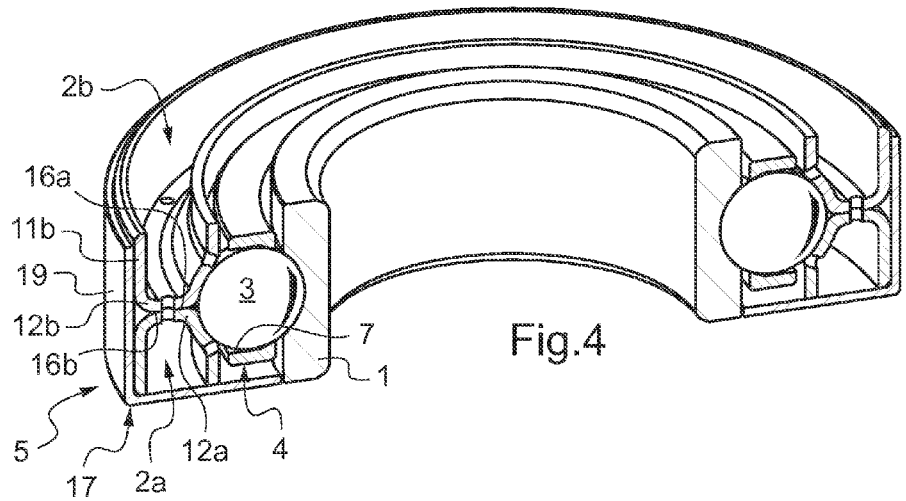
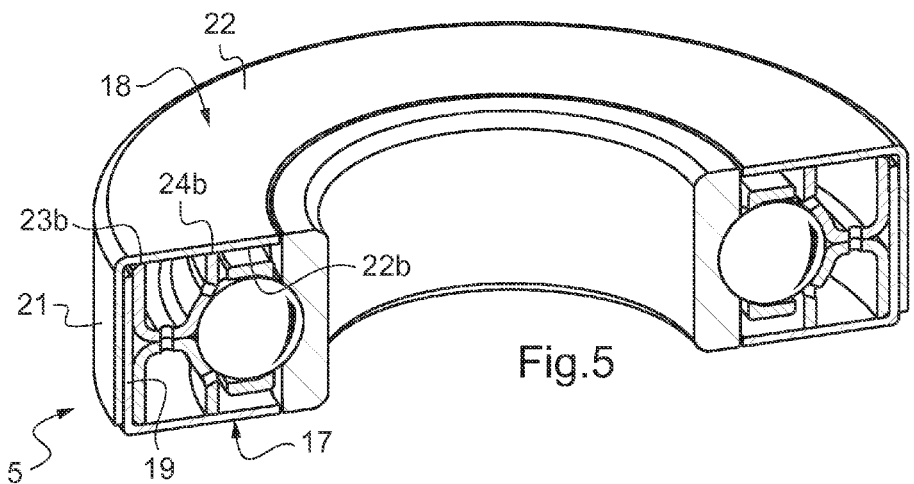

ROLLING BEARING COMPRISING A HOUSING HAVING TWO PARTS AND METHOD OF MANUFACTURING SUCH A BEARING

CROSS REFERENCE TO RELATED APPLICATION

This application is a National Stage application claiming the benefit of International Application Number PCT/EP2011/057877 filed on 16 May 2011.

FIELD OF THE INVENTION

The present invention relates to rolling bearings, in particular to rolling bearings having an inner ring and an outer ring with one or more rows of rolling elements held by a cage between raceways provided in the two rings. The rolling elements may, for example, be balls. The rolling bearings may be, for example, those used in industrial electric motors or in motor vehicle gearboxes. In such applications, the bearings are mainly loaded radially, often with relatively weak load compared to the capacity of the bearings used. The rotational speeds in such applications are of the order of 3000 revolutions/minute.

BACKGROUND OF THE PRESENT INVENTION

U.S. Pat. No. 3,876,266 discloses a rolling bearing comprising an inner ring, an outer ring made in two parts, a housing holding the two parts of the said ring and a row of balls held by a cage. One of the parts of the outer ring, together with the housing, defines a space inside which an axially preloaded resilient element is housed.

This document also discloses a method of manufacturing such rolling bearings comprising the steps of inserting the rolling element into the associated cage and mounting this subassembly on the inner ring. Then positioning the two parts of the outer ring are around the row of balls, mounting this subassembly and the resilient preloaded element in an L-shaped housing having an outer cylindrical part and folding said cylindrical part over one closed space and one ring until it encloses said one ring and said rolling elements. Given the way these rolling bearings are manufactured, and particularly the fact that the housing is folded over to form a second radial plate, it is relatively difficult to guarantee the desired axial clearance or, the predefined axial preload. Furthermore, it is necessary to provide a resilient axial preloaded element, which adds to the cost of the rolling bearing. Patent application FR 2 945 090 solve these problems by proposing a rolling bearing comprising a housing made of two distinct parts fixed together. The housing comprises two radial flanges for axially retaining the parts of the outer ring and an axial cylindrical portion connected to one of the radial flanges and in radial contact with the parts of said outer ring and extending radially outwards by a radial projection. One of the radial flanges is fixed to the radial projection.

However, such a rolling bearing needs a specific reception hole for the rolling bearing having a stepped shape. Furthermore, when assembling such a rolling bearing, a slightly deformation of the outer surface of the axial cylindrical portion may modify the positioning of the two separate parts of the outer ring. Such a rolling bearing does not prevent solid and liquid pollutants from entering between the flanges and the radial projection.

BRIEF DESCRIPTION OF THE PRESENT INVENTION

One aim of the present invention is therefore to overcome the aforementioned drawbacks.

It is a particular object of the present invention to provide a rolling bearing of simple design, that is easy to assemble, economical, and in which the desired clearance or axial preload can easily be obtained during the assembly operations and maintained once the bearing has been assembled.

It is also an object of the present invention to provide a rolling bearing having a good radial stiffness and which is able to operate for a long time in both an effective and economic manner.

Another object of the invention is to provide a rolling bearing in which the positioning of the half rings is not sensitive to the deformation of the housing.

In one embodiment, a rolling bearing comprises an inner ring, an outer ring, at least one row of rolling elements between the inner and outer rings, and an annular housing surrounding at least one of the rings, said outer ring comprising two separate parts. The housing comprises two distinct parts for retaining the parts of said outer ring and fixing means for fixing the distinct parts together.

The first part of the housing comprises an inner axial cylindrical portion for retaining radially said outer rings and the second part of the housing comprises an outer axial cylindrical portion surrounding said inner axial cylindrical portion.

Assembling two separate parts or components in order to obtain the enclosing ring or housing that retains the parts of the ring makes the assembly operations easier and makes it possible to guarantee that the desired operational clearance or axial preload for the rolling bearing will be obtained. This thus provides a rolling bearing able to operate for a long time thanks to effective internal lubrication.

The first part of the housing preferably comprises a radial flange extending radially from the inner cylindrical portion towards the inner ring and defining with one of the parts of the outer ring a first closed space.

The second part of the housing preferably comprises a radial flange extending radially from the outer cylindrical portion towards the inner ring and defining with one of the parts of the outer ring a second closed space.

In one embodiment, both closed spaces contain a lubricant and act as lubricant reservoirs. The lubricant may be grease or oil. When the lubricant is oil, this oil may advantageously be contained in a porous element mounted inside the closed space.

Advantageously, each of said separate parts of the outer ring comprises passage means for the lubricant contained in the closed spaces.

The passage means for the lubricant may comprise axial holes at least partly facing one another provided in the thickness of a radial portion of each of the two separate parts of said outer ring, so as to put the two closed spaces into communication. Special-purpose passage means are preferably provided to allow lubricant to pass between the closed space and the raceways. The passage means may comprise holes or passages made in the thickness of the said ring. These passages preferably open onto the raceway of the said ring.

In one embodiment, the distinct parts of the housing are manufactured by cutting and pressing a metal sheet.

Fixing means may comprise welds or brazing or glue. Alternatively, it is even possible to fix the two parts together using crimping, bonding, riveting, snap-fastening, etc.

According to another aspect, it is proposed a method of manufacturing a rolling bearing as disclosed above, comprising the steps of:

inserting one of the separate parts of the outer ring in a first part of the housing having an L-shaped structure comprising an inner axial cylindrical portion for retaining radially said outer ring, inserting the inner ring and said rolling elements in the first part of the housing, inserting the other separate part of the outer ring in the first part of the housing, fixing the second part of the housing having an L-shaped structure comprising an outer axial cylindrical portion so as to surround said inner axial cylindrical portion.

BRIEF DESCRIPTION OF THE DRAWINGS

The present invention will be better understood from studying the detailed description of a number of embodiments considered by way of entirely non-limiting examples and illustrated by the attached drawings in which:

FIG. 3 is a first step of a manufacturing method according to the invention;

FIG. 4 is a second step of a manufacturing method according to the invention; and FIG. 5 is a third step of a manufacturing method according to the invention.

DETAILED DESCRIPTION OF THE PRESENT INVENTION

Figure 1:
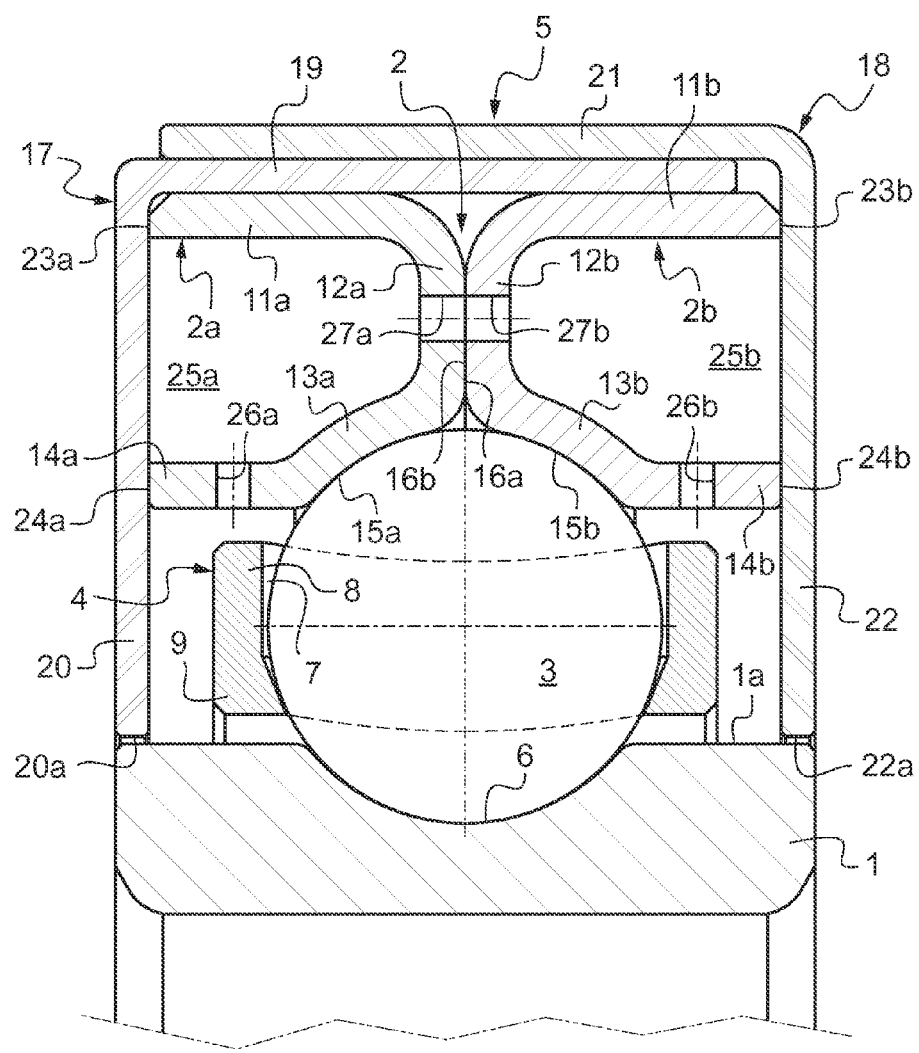
FIG. 1 is an axial half-section of the rolling bearing according to the invention, in a first embodiment.

Referring first to FIG. 1, which illustrates an embodiment of a rolling bearing according to the invention; said bearing comprises an inner ring 1, an outer ring 2, a row of rolling elements 3 consisting, in the example illustrated, of balls, held by a cage 4 between the inner ring 1 and the outer ring 2 and an annular housing 5 surrounding the outer ring 2.

The inner ring 1 is solid and has on its outer cylindrical surface 1a a toroidal groove 6, the radius of curvature of which is slightly greater than the radius of the rolling elements 3 and forms a bearing race for the rolling elements 3. The inner ring 1 may be manufactured by machining or by pressing a steel blank, which is then ground and optionally lapped at the bearing race 6 in order to give the ring 1 its geometrical characteristics and its final surface finish.

The cage 4 comprises a plurality of cavities 7 designed to house the rolling elements 3 and keep them uniformly circumferentially spaced. The cavities 7 are advantageously of spherical shape with a diameter slightly greater than that of the rolling elements 3. The cavities 7 are provided in the radial thickness of the cage 4 having a radial portion 8 radially facing the outer ring 2 and extending radially inwards by a conical portion 9. The conical portion is located radially facing the inner ring 1 and extends axially towards the rolling elements 3. The radial portion 8 and the conical portion 9 define the cavities 7. The conical portion 9 forms a guide portion for the rolling elements 3.

In this embodiment, the outer ring 2 comprises two separate parts 2a, 2b or half rings. The separate parts 2a, 2b are identical and symmetric with respect to the axial plane of symmetry of the bearing, in order to reduce manufacturing costs. These two outer half rings 2a, 2b may advantageously be manufactured by cutting and stamping a metal sheet, the pieces obtained being then hardened by heat treatment. The bearing races intended for the rolling elements 3 may be ground and/or lapped in order to give them their geometric characteristics and their definitive surface finish. Since the two half-rings 2a, 2b are identical in this example, only one of them, having the reference "a" will be described here, it being understood that the identical elements of the other half-ring 2b bear the reference "b" in the figures.

The half-ring 2a of the outer ring 2 comprises an outer axial cylindrical portion 11a, a radial portion 12a, a toroidal portion 13a and an inner axial cylindrical portion 14a. The radial portion 12a is connected to the outer axial portion 11a and to the toroidal portion 13a. The toroidal portion 13a defines part of a raceway 15a for the rolling elements 3. The radius of curvature of the raceway 15a slightly exceeds the radius of the rolling elements 3. The toroidal portion 13a extends axially towards the outside of the rolling bearing with the inner axial portion 14a. The two outer half-rings 2a, 2b are arranged with the axially internal radial faces 16a, 16b of the radial portions 12a, 12b in axial contact with one another, substantially in the radial symmetry plane of the rolling elements 3.

The housing 5, which is advantageously made of a stamped metal sheet, comprises two distinct annular parts 17, 18 surrounding the two outer half-rings 2a, 2b so as to hold them firmly together in the axial direction. The parts 17, 18 of the housing 5 may advantageously be produced in an economical way from a single metal sheet by cutting and pressing. Each distinct part 17, 18 have an reshaped structure.

The first part 17 comprises an inner axial cylindrical portion 19 for retaining radially said outer rings 2a, 2b. The inner axial cylindrical portion 19 surrounds the outer rings 2a, 2b and is in contact with the outer surface of the axial portions 11a, 11b of the outer rings 2a, 2b. The first part 17 further comprises a radial flange 20 extending radially from the inner axial cylindrical portion 19 towards the immediate vicinity of the outer cylindrical surface 1a of the inner ring 1, so as to leave a clearance between the inner edge 20a of the radial flange 20 and the cylindrical surface 1a of the inner ring 1.

The second part 18 of the housing 5 comprises an outer axial cylindrical portion 21 surrounding the inner axial cylindrical portion 19 of the first part 17. The second part 18 further comprises a radial flange 22 extending radially from the outer cylindrical portion 21 towards the immediate vicinity of the outer cylindrical surface 1a of the inner ring 1, so as to leave a clearance between the inner edge 22a of the radial flange 22 and the outer cylindrical surface 1a of the inner ring 1.

The half-rings 2a, 2b are centered in the inner axial portion 19 of the first part 17 of the housing 5 by contact between the axial portions 11a, 11b and the bore of the said inner axial portion 19. The outer radial faces 23a, 23b which form the outer edges of the outer axial portions 11a, 11b are respectively in contact with the radial flanges 20, 22 of the parts 17, 18 of the housing 5, thus axially clamping the two half-rings 2a, 2b together. The outer radial faces 24a, 24b which form the outer edges of the inner axial portions 14a, 14b are also in contact with the radial flanges 20, 22.

As an alternative, an axial clearance (not shown) may be provided between the outer edges 24a, 24b of the inner axial portions 14a, 14b and the radial flanges 20, 22 of the housing 5.

Each of the half-rings 2a, 2b defines, with the housing 5, an annular closed space 25a, 25b. More specifically, the closed space 25a is delimited by the outer axial portion 11a, the radial portion 12a, the toroidal portion 13a, and the inner axial portion 14a, and, adjacent to these portions, the radial flange 20 of the first part 17 of the housing 5. One of the two or both spaces 25a, 25b may act as a lubricant reservoir, the lubricant contained in these spaces 25a, 25b not being depicted in the figures. The lubricant used may be grease or oil. Lubricant can be packed into the space 25a which constitutes a first lubricant reservoir between the half-ring 2a and the inner ring 1. Lubricant is also packed into the second space 25b and into the volume remaining between the inner 1 and outer 2 rings.

Each part 2a, 2b of the outer ring 2 comprises passage means for the lubricant contained in the closed spaces 25a, 25b. In the example illustrated in FIG. 1, these passage means are of several types. First, these passage means comprise a plurality of radial through-holes 26a, 26b provided the thickness of the inner axial portions 14a, 14b of the outer half-rings 2a, 2b. This arrangement of the holes allows the lubricant contained in the closed spaces 25a, 25b to flow by gravity directly towards the rolling elements 3. Further a plurality of axial through-holes 27a, 27b can be provided the thickness of the radial portion 12a, 12b at least partially facing one another, so as to put the two closed spaces 25a, 25b into communication. This arrangement, which can be maintained by suitable positioning during assembly or by angular indexing means (not shown), provided on the two half-rings 2a, 2b, allows the two closed spaces 25a, 25b to intercommunicate. As an alternative, each inner radial face 16a, 16b of the corresponding radial portion 12a, 12b can be provided with a radial groove (not shown) forming a radial passage or duct so that the outer end of the radial duct is in communication with the corresponding through-hole 27a, 27b and its inner end is in communication with the toroidal race 15a, 15b so as to guide the lubricant directly onto the balls 3. In this example, it should be understood that the axial through-holes 27a, 27b associated with a radial duct can easily not be located facing one another.

The outer axial cylindrical portion 21 is fixed to the inner axial cylindrical portion 19 by means of welding, brazing or glue.

In the embodiment of FIG. 1, the inner radial faces 16a, 16b of the radial portions 12a, 12b are in contact with one another. This contact between the radial portions 12a, 12b makes it possible to obtain a rolling bearing with internal preload.

Figure 2:
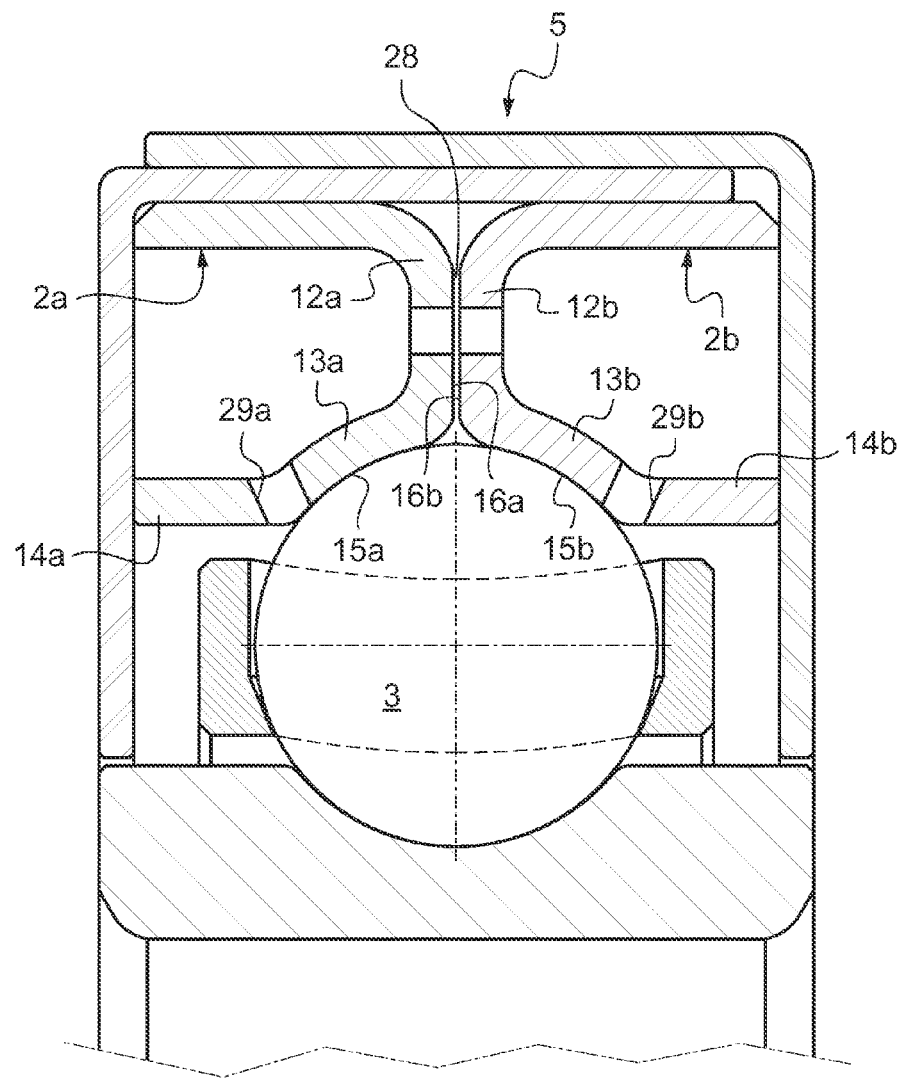
FIG. 2 is an axial half-section of a second embodiment.

The only difference with the embodiment of FIG. 2, in which identical elements bear the same references, is the presence of an axial clearance 28 between the inner radial faces 16a, 16b of the radial portions 12a, 12b so that the rolling bearing can operate with no internal preload. In some applications, it is preferred that the rolling bearing has an internal preload, that is to say a preload both in the radial and axial directions. For instance, in an electric power assisted steering system for a vehicle, such a bearing advantageously supports in rotation the rotor of the vehicle motor in order to prevent any click noise. In other applications though, it is desired to use a rolling bearing with no internal preload i.e. with an internal clearance, in order, for instance, to reduce friction and to compensate thermal expansion of the rings.

In the embodiment of FIG. 2, the radial through-holes have been removed and the toroidal portions 13a, 13b are now provided with through-holes 29a, 29b in order to let the lubricant flow directly onto the balls 3. Of course, as a variant, it could be possible to mix all types of passages means described above.

The method of manufacturing such types of bearings will now be described on the basis of FIGS. 3 to 5. On FIG. 3, one of the half rings 2a of the outer ring 2 is inserted in the L-shaped structure of the first part 17 of the housing 5, with the radial faces 23a, 24a of the half ring 2a resting on the inner surface of the radial flange 20 and the outer surface of the axial portion 11a in contact with the inner axial cylindrical portion 19 of the first part 17. On FIG. 4, the inner ring 1 is then mounted. Having inserted the rolling elements 3 into the cavities 7 of the cage 4 and having mounted that subassembly on the inner ring 1, the second half-ring 2b is positioned around the row of rolling elements 3 in the L-shaped structure 17 with the radial face 16a of the radial portion 12a in contact with the radial face 16b of the radial portion 12b of the half ring 2b. The outer surface of the outer axial portion 11b is in contact with the inner surface of the inner axial cylindrical portion 19. As illustrated in FIG. 5, the second part 18 of the housing 5 is then positioned so that its outer axial cylindrical portion 21 surrounds the inner axial cylindrical portion 19 of the first part 17. The outer radial faces 23b, 24b of the axial portions 11b, 14b are in contact with the inner radial face 22b of the radial flange 22 of the second part 18. The second part 18 of the housing 5 is fitted to retain the half-rings 2a, 2b axially. The specific features and characteristics mentioned for each of the embodiments could be applied without major modification to the other embodiments. Moreover, although the present invention has been illustrated using single-row ball bearings, it will be understood that the invention can be applied without major modification to bearings using rolling elements that are not balls and/or that have several rows of rolling elements. Alternatively, the inner ring could comprise two half rings and be surrounded by a housing having two distinct parts as described above.

Thanks to the housing made of two L-shaped parts, the rolling bearing according to the invention is less sensitive to deformation of the outer surface of the outer cylindrical portion of the second part of housing, and therefore has a good radial stiffness. Furthermore, such a rolling bearing prevents solid and liquid pollutants from entering inside the rolling bearing.

The invention claimed is:

1. A rolling bearing comprising;
an inner ring,
an outer ring, the outer ring comprising two separate parts,
at least one row of rolling elements between the inner and outer rings,
a cage disposed between the inner ring and the outer ring and configured to maintain the at least one row of rolling elements circumferentially spaced, the cage having first and second axial ends;
an annular housing surrounding the outer ring and the first and second axial ends of the cage, the annular housing comprising a first part and a second part which are distinct from each other, the housing retaining the two separate parts of said outer ring, the first part of the annular housing comprises an inner axial cylindrical portion for retaining radially said outer ring and enclosing the first axial end of the cage, the second part of the annular housing comprises an outer axial cylindrical portion surrounding said inner axial cylindrical portion and enclosing the second axial end of the cage, and
a fixing element configured to secure the first part of the annular housing to the second part of the annular housing.

2. The rolling bearing according to claim 1, in which the first part of the housing comprises a radial flange extending radially from the inner cylindrical portion towards the inner ring and defining with one of the parts of the outer ring a first closed space.

3. The rolling bearing according to claim 2, in which the second part of the housing comprises a radial flange extending radially from the outer cylindrical portion towards the inner ring and defining with one of the parts of the outer ring a second closed space.

4. The rolling bearing according to claim 3, in which both closed spaces contain a lubricant and act as lubricant reservoirs.

5. The rolling bearing according to claim 4, in which each of said two separate parts of the outer ring comprises a fluid passageway for the lubricant contained in the closed spaces.

6. The rolling bearing according to claim 5, in which the fluid passageway for the lubricant comprise axial holes at least partly facing one another provided in the thickness of a radial portion of each of the two separate parts of said outer ring, so as to put the two closed spaces into communication.

7. The rolling bearing according to claim 1, in which the first part and the second part of the housing are manufactured by cutting and pressing a metal sheet.

8. The rolling bearing according to claim 1, in which the fixing element-comprise one of welds, brazing, or glue.

9. A method of manufacturing a rolling bearing comprising:
> providing an inner ring, an outer ring, a cage, at least one row of rolling elements between the inner and outer rings, and an annular housing surrounding first and second axial ends of the cage and the outer ring, said outer ring comprising two separate parts, the housing comprising a first part and a second part which are distinct from each other for retaining the parts of said outer ring and a fixing element for securing the first part and the second part of the housing together, wherein the first part of the housing comprises an inner axial cylindrical portion for retaining radially said outer ring and the second part of the housing comprises an outer axial cylindrical portion surrounding said inner axial cylindrical portion,
>
> inserting one of the separate parts of the outer ring in the first part of the housing having an L-shaped structure comprising the inner axial cylindrical portion for retaining radially said outer ring,
>
> inserting the inner ring and the rolling elements in the first part of the housing,
>
> inserting the other separate part of the outer ring in the first part of the housing,
>
> fixing the second part of the housing to have a reshaped structure comprising an outer axial cylindrical portion so as to surround said inner axial cylindrical portion.

* * * * *